(12) United States Patent
Iga et al.

(10) Patent No.: US 8,885,806 B2
(45) Date of Patent: Nov. 11, 2014

(54) CONFERENCE PROGRESS SUPPORTING APPARATUS

(75) Inventors: Soichiro Iga, Tokyo (JP); Makoto Shinnishi, Kanagawa (JP); Masashi Nakatomi, Kanagawa (JP); Kaoru Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/497,926

(22) PCT Filed: Sep. 27, 2010

(86) PCT No.: PCT/JP2010/067300
§ 371 (c)(1),
(2), (4) Date: Mar. 23, 2012

(87) PCT Pub. No.: WO2011/043274
PCT Pub. Date: Apr. 14, 2011

(65) Prior Publication Data
US 2012/0219140 A1 Aug. 30, 2012

(30) Foreign Application Priority Data
Oct. 7, 2009 (JP) .................................. 2009-232979

(51) Int. Cl.
*H04M 3/42* (2006.01)
*G06Q 10/00* (2012.01)
(52) U.S. Cl.
CPC ...................................... *G06Q 10/00* (2013.01)
USPC .................................... 379/202.01; 705/7.13
(58) Field of Classification Search
USPC ........................... 379/202.01; 705/7.13–7.16
See application file for complete search history.

(56) References Cited

U.S. PATENT DOCUMENTS

| 7,167,833 B2* | 1/2007 | Mashiko et al. ............. 705/7.16 |
| 2005/0050061 A1* | 3/2005 | Karstens ....................... 707/100 |

(Continued)

FOREIGN PATENT DOCUMENTS

| JP | 2005 173705 | 6/2005 |
| JP | 2005 267279 | 9/2005 |

(Continued)

OTHER PUBLICATIONS

Nagao, "Discussion Mining: Knowledge Discovery from Face-to-Face Meetings", MSRC, Proceedings of the Second Spoken Document Processing Workshop, pp. 41 to 50, Mar. 1, 2008.
Nishi et al., "Interaction Analysis in the meetings among customers & software developers", IPSJ Sig Notes, vol. 92, No. 15, pp. 17 to 24, Mar. 3, 1992.

(Continued)

*Primary Examiner* — Nafiz E Hoque
(74) *Attorney, Agent, or Firm* — Oblon, Spivak, McClelland, Maier & Neustadt, L.L.P.

(57) ABSTRACT

A disclosed conference progress supporting apparatus includes a unit to store information indicating each agenda of the conference and information indicating each participant of the conference, a unit to acquire information via an input device, the information indicating a start and an end of a speech of the participant of the agenda, a unit to store progress information in the conference information storage unit, the progress information associating the agenda, the participants, a start time when the information indicating the start is acquired, and an elapsed time since the start time with each other in response to the acquisition of the information indicating the start, and update the progress information by measuring the elapsed time until the information indicating the end is acquired, and a unit to present information indicating a speech status of each of the participants of each of the agendas based on the progress information.

4 Claims, 21 Drawing Sheets

(56) References Cited

U.S. PATENT DOCUMENTS

2006/0224430 A1* 10/2006 Butt .................................. 705/8
2007/0124682 A1 5/2007 Fukeda et al.
2007/0162413 A1 7/2007 Sonetaka

FOREIGN PATENT DOCUMENTS

| JP | 2006 208482 | 8/2006 |
| JP | 2007 43493 | 2/2007 |
| JP | 2007 256498 | 10/2007 |
| RU | 2 155 383 C1 | 8/2000 |
| RU | 2324973 C1 | 5/2008 |
| RU | 2 326 428 C1 | 6/2008 |
| WO | 02 103591 | 12/2002 |

OTHER PUBLICATIONS

Yokomori, et al., "The E-conference Playback System with Recorded Transaction Between Teleconference Clients and Server", IPSJ Sig Notes, vol. 2001 No. 32, pp. 65 to 70, Mar. 23, 2001.

International Search Report issued on Dec. 28, 2010 in PCT/JP10/067300 filed on Sep. 27, 2010.

The Extended European Search Report issued Jul. 25, 2013, in Application No. / Patent No. 10821945.2—1958 / 2486524 PCT/JP2010067300.

Office Action Issued Mar. 5, 2013, in Russian Patent Application No. 2012118594/08(028066) with English translation.

Office Action issued Nov. 12, 2013 in Russian Patent Application No. 2012118594/08 with English language translation.

* cited by examiner

| | AIHARA | TAMADA | SAWATARI | | | |
|---|---|---|---|---|---|---|
| | 10 MIN. | 0 MIN. | 5 MIN. | | | |
| 15 MIN./70 MIN. | | | | | | |
| AGENDA 1  25 MIN.  AIHARA | 10 MIN. | | | | | |
| AGENDA 2  15 MIN. | | | | | | |
| AGENDA 3  10 MIN. | | | | | | |
| AGENDA 4  20 MIN. | | | | | | |

[CLOSE] [PARTICIPANT MANAGE] [AGENDA MANAGE] [REVIEW]

| PARTICIPANT ID | PARTICIPANT | FACILITY | DIVISION | E-MAIL |
|---|---|---|---|---|
| 1 | AIHARA | FACILITY A | DIVISION A | aihara@mail.aaa |
| 2 | TAMADA | FACILITY B | DIVISION B | tamada@mail.bbb |
| 3 | SAWATARI | FACILITY C | DIVISION C | sawatari@mail.ccc |
| ... | ... | ... | ... | ... |

FIG.6

| AGENDA ID | TITLE | SCHEDULED DISCUSSION TIME (MIN) | CONTRIBUTOR ID | CONTRIBUTOR | EDIT TIME AND DATE |
|---|---|---|---|---|---|
| 1 | AGENDA 1 | 25 | 1 | AIHARA | 2009/05/29 08:55 |
| 2 | AGENDA 2 | 15 | 1 | AIHARA | 2009/05/29 09:10 |
| 3 | AGENDA 3 | 10 | 2 | TAMADA | 2009/06/01 09:15 |
| 4 | AGENDA 4 | 20 | 1 | AIHARA | 2009/06/02 14:30 |
| ... | ... | ... | ... | ... | ... |

FIG.7

| AGENDA ID | PARTICIPANT ID | START TIME | END TIME | ELAPSED TIME |
|---|---|---|---|---|
| 1 | 1 | 09:00 | 09:10 | 10 |
| 1 | 3 | 09:05 | 09:10 | 5 |
| 2 | 2 | 09:15 | | 5 |
| ... | ... | ... | ... | ... |

FIG.8

| PARTICIPANT ID | PARTICIPANT | FACILITY | DIVISION | E-MAIL |
|---|---|---|---|---|
| 1 | AIHARA | FACILITY A | DIVISION A | aihara@mail.aaa |
| 2 | TAMADA | FACILITY B | DIVISION B | tamada@mail.bbb |
| 3 | SAWATARI | FACILITY C | DIVISION C | sawatari@mail.ccc |
| ... | ... | ... | ... | ... |

[ REGISTRATION ]

FIG.9

| AGENDA ID | TITLE | SCHEDULED DISCUSSION TIME (MIN) | CONTRIBUTOR | EDIT TIME AND DATE |
|---|---|---|---|---|
| 1 | AGENDA 1 | 25 | AIHARA | 2009/05/29 08:55 |
| 2 | AGENDA 2 | 15 | AIHARA | 2009/05/29 09:10 |
| 3 | AGENDA 3 | 10 | TAMADA | 2009/06/01 09:15 |
| 4 | AGENDA 4 | 20 | AIHARA | 2009/06/02 14:30 |
| ⋮ | ⋮ | ⋮ | ⋮ | ⋮ |

REGISTRATION

FIG.10

| | AIHARA 15 MIN. | TAMADA 10 MIN. | SAWATARI 10 MIN. |
|---|---|---|---|

CLOSE | PARTICIPANT MANAGE | AGENDA MANAGE | REVIEW

35 MIN./80 MIN.

AGENDA 1  AIHARA | SAWATARI  25 MIN.

AGENDA 2  15 MIN.

AGENDA 3  10 MIN.

AGENDA 4  20 MIN. 30 MIN.

FIG.12

| | AIHARA 10 MIN. | TAMADA 0 MIN. | SAWATARI 5 MIN. | | | |
|---|---|---|---|---|---|---|
| 15 MIN./70 MIN. | | | | | | |
| AGENDA 1 — 25 MIN. [AIHARA][SAWATARI] | | | | | | |
| AGENDA 2 — 15 MIN. | | | | | | |
| AGENDA 3 — 10 MIN. | | | | | | |
| AGENDA 4 — 20 MIN. | | | | | | |

CLOSE | PARTICIPANT MANAGE | AGENDA MANAGE | REVIEW

5 MIN.

| | AIHARA<br>10 MIN. | TAMADA<br>0 MIN. | SAWATARI<br>5 MIN. | | | |
|---|---|---|---|---|---|---|
| 15 MIN./70 MIN. | | | | | | |
| AGENDA 1<br>25 MIN. | AIHARA SAWATARI | | | | | |
| AGENDA 2<br>15 MIN. | | 0 MIN. | | | | |
| AGENDA 3<br>10 MIN. | | | | | | |
| AGENDA 4<br>20 MIN. | | | | | | |

CLOSE  PARTICIPANT MANAGE  AGENDA MANAGE  REVIEW

CONFERENCE PROGRESS SUPPORTING APPARATUS

TECHNICAL FIELD

The present invention relates to a conference progress supporting apparatus supporting progress of a conference.

BACKGROUND ART

Conventionally, an action or a method is called facilitation when participating in a conference or the like to urge speech, manage the flow of conversation, and check consensus among participants to accelerate mutual understanding among the participants, and lead to form consensus among the participants.

Further, in a conference, a participant who performs facilitation is called a facilitator. The facilitator may have to manage progress of a subject of the conference (hereinafter referred to as an "agenda") as well as manage speech status such as adjusting imbalance of speakers.

To support such facilitation, there has been known a conference progress supporting apparatus which allows the setting of each scheduled discussion time of each agenda in a conference, the determination of schedule of the agendas, and, when each agenda is completed, the reschedule of the remaining agendas in consideration of changing order of agendas and discussion time (e.g. Patent Documents 1 and 2).

Patent Document 1: WO2002/103591
Patent Document 2: Japanese Patent Application Publication No.: 2007-43493

DISCLOSURE OF THE INVENTION

Problems to be Solved by the Invention

However, in conventional techniques, the facilitator may have to remember a speech status in which, for example, which participant speaks to what extent about which agenda. Further, after a conference ends, the facilitator may have to remember the speech status of the entire conference so as to review the speech status to check which speech is interrupted, a status of simultaneous speech and the like.

Namely, in conventional techniques, the work load of the facilitator managing the speech status is high.

The present invention is made in light of the above circumstances, and may provide a conference progress supporting apparatus capable of supporting the management of the speech status.

Means for Solving the Problems

According to an aspect of the present invention, a conference progress supporting apparatus supporting progress of a conference includes a conference information storage unit storing information indicating each agenda of the conference and information indicating each participant of the conference, a speech information acquisition unit acquiring information via an input device, the information indicating a start and an end of a speech of the participant of the agenda, a progress management unit storing progress information in the conference information storage unit, the progress information associating the agenda, the participants, a start time when the information indicating the start is acquired, and an elapsed time since the start time with each other in response to the acquisition of the information indicating the start, and updating the progress information by measuring the elapsed time until the information indicating the end is acquired, and a speech status presentation unit presenting information indicating a speech status of each of the participants of each of the agendas based on the progress information.

By having this configuration, the conference process supporting apparatus according to this aspect of the present invention may store the process information of the speech in response to the acquisition of the information indicating the start and the end of the speech of each participant, and, based on the process information, present the information indicating the speech status of each participant, thereby allowing the facilitator to recognize the speech status and supporting the management of the speech status.

Further, based on the progress information, as the speech status, the speech status presentation unit may present information indicating a sum of speech time of each of the agendas and information indicating each component of each of the participants included in the sum of the speech time.

By having this configuration, the conference process supporting apparatus according to this aspect of the present invention may allow the facilitator to recognize the participant who provides many speeches of each agenda and adjust the imbalance of the speakers.

Further, based on the progress information, as the speech status, the speech status presentation unit may arrange the information indicating each speech on a time axis, and present a time period when no information indicating the speech is arranged and a time period when plural information indicating the speech are overlapped.

By having this configuration, the conference process supporting apparatus according to this aspect of the present invention may allow the facilitator to review the speech status from the start to the end of the conference after the conference. As a result, the facilitator may recognize the case where the facilitator could not prompt speech and the case where the facilitator could not sufficiently control the speeches so that, based on the recognitions, the facilitator may better manage the speech status in the next conference.

A conference progress supporting method according to an aspect of the present invention used in a conference progress supporting apparatus supporting progress of a conference includes a conference information storing step in which the conference progress supporting apparatus stores information indicating each agenda of the conference and information indicating each participant of the conference in a storage device, a speech information acquiring step in which the conference progress supporting apparatus acquires information via an input device, the information indicating a start and an end of a speech of the participant of the agenda, a progress managing step in which the conference progress supporting apparatus stores progress information in the storage device, the progress information associating the agenda, the participants, a start time when the information indicating the start is acquired, and an elapsed time since the start time with each other in response to the acquisition of the information indicating the start, and updates the progress information by measuring the elapsed time until the information indicating the end is acquired, and a speech status presenting step in which the conference progress supporting apparatus presents information indicating a speech status of each of the participants of each of the agendas based on the progress information.

Therefore, in this conference progress supporting method, based on the progress information of the speeches, the information indicating the speech status of each participant may be present, thereby allowing the facilitator to recognize the speech status and supporting the management of the speech status.

A conference progress supporting program according to an aspect of the present invention causing a conference progress supporting apparatus to support progress of a conference includes a conference information storing step of storing information indicating each agenda of the conference and information indicating each participant of the conference in a storage device, a speech information acquiring step of acquiring information via an input device, the information indicating a start and an end of a speech of the participant of the agenda, a progress managing step of storing progress information in the storage device, the progress information associating the agenda, the participants, a start time when the information indicating the start is acquired, and an elapsed time since the start time with each other in response to the acquisition of the information indicating the start, and updating the progress information by measuring the elapsed time until the information indicating the end is acquired, and a speech status presenting step of presenting information indicating a speech status of each of the participants of each of the agendas based on the progress information.

Therefore, the conference progress supporting program according to this aspect of the present invention may present the information indicating the speech status of each participant based on the progress information of the speeches, thereby allowing the facilitator to recognize the speech status and supporting the management of the speech status.

Effects of the Present Invention

According to an embodiment of the present invention, a conference progress supporting apparatus may support the management of speech status.

BRIEF DESCRIPTION OF THE DRAWINGS

FIG. 3 is a drawing indicating an example when a speech status is presented in the conference progress supporting apparatus according to an embodiment of the present invention;

FIG. 5 is a drawing illustrating a participant table stored in the conference progress supporting apparatus according to an embodiment of the present invention;

FIG. 6 is a drawing illustrating an agenda table stored in the conference progress supporting apparatus according to an embodiment of the present invention;

FIG. 7 is a drawing illustrating a progress table stored in the conference progress supporting apparatus according to an embodiment of the present invention;

FIG. 8 is a drawing indicating an example of a participant management screen presented by the conference progress supporting apparatus according to an embodiment of the present invention;

FIG. 9 is a drawing indicating an example of an agenda management screen presented by the conference progress supporting apparatus according to an embodiment of the present invention;

FIG. 10 is a drawing indicating an example of a screen when scheduled discussion time of an agenda is changed in the conference progress supporting apparatus according to an embodiment of the present invention;

FIG. 12 is a drawing indicating an example of a screen at a speech end time in the conference progress supporting apparatus according to an embodiment of the present invention;

DESCRIPTION OF THE REFERENCE NUMERALS

1: CONFERENCE PROGRESS SUPPORTING APPARATUS
11: CPU
12: RAM
13: ROM
14: HARD DISK DEVICE
15: INPUT DEVICE
16: DISPLAY DEVICE
21: CONFERENCE INFORMATION STORAGE SECTION
22: CONFERENCE INFORMATION MANAGEMENT SECTION
23: SPEECH INFORMATION ACQUISITION SECTION
24: PROGRESS MANAGEMENT SECTION
25: SPEECH STATUS PRESENTATION SECTION

Best Mode for Carrying Out the Invention

In the following, an embodiment of the present invention is described with reference to the accompanying drawings.

First, a hardware configuration of a conference progress supporting apparatus 1 according to an embodiment of the present invention is described with reference to FIG. 1.

Figure 1:
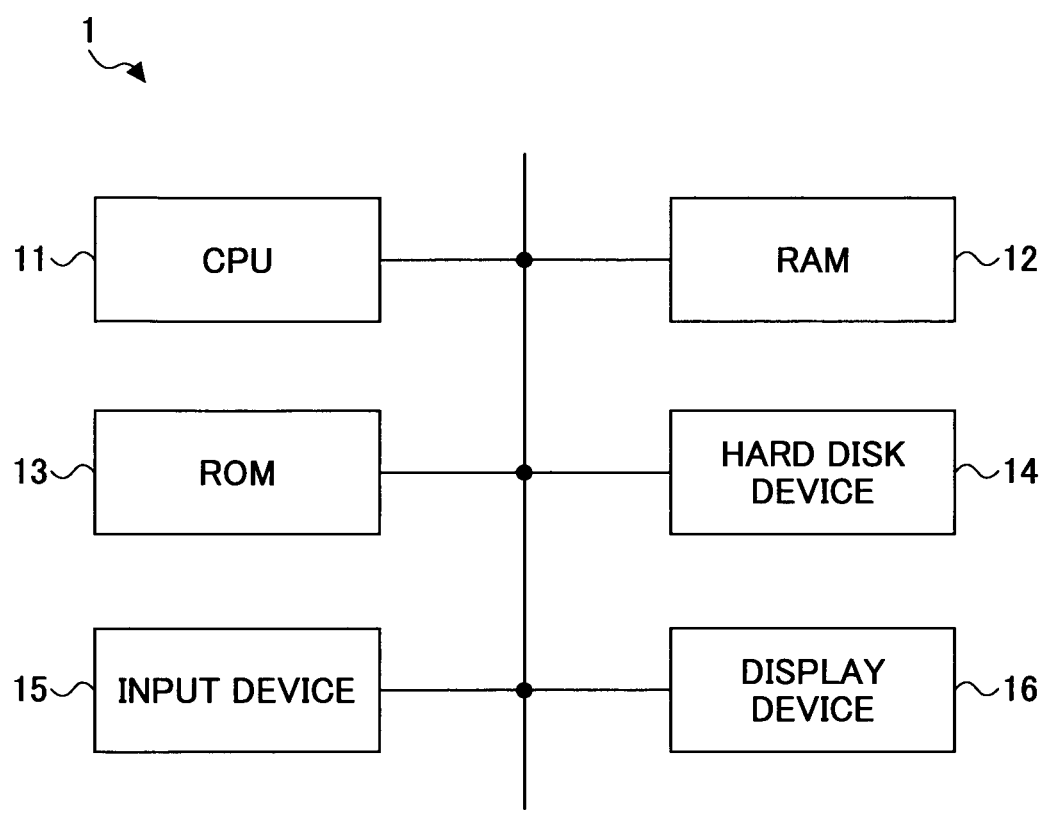
FIG. 1 is a drawing illustrating a hardware configuration of a conference progress supporting apparatus according to an embodiment of the present invention.

As illustrated in FIG. 1, the conference progress supporting apparatus 1 includes a general-purpose computer apparatus having a CPU (Central Processing Unit) 11, a RAM (Random Access Memory) 12, a ROM (Read Only Memory) 13, a hard disk device 14, an input device 15, and a display device 16.

The ROM 13 and the hard disk device 14 stores programs causing the computer apparatus to function as the conference progress supporting apparatus 1. Namely, while using the RAM 12 as a working area, the CPU 11 executes the programs stored in the ROM 13 and the hard disk device 14, thereby causing the computer apparatus to function as the conference progress supporting apparatus 1.

The input device 15 includes a keyboard, a mouse and the like, and receives user's operations to the conference progress supporting apparatus 1.

The display device 16 includes a Liquid Crystal Display (LCD) or the like to display a screen generated by the conference progress supporting apparatus 1.

Next, a functional block diagram of the conference progress supporting apparatus 1 is described with reference to FIG. 2.

Figure 2:
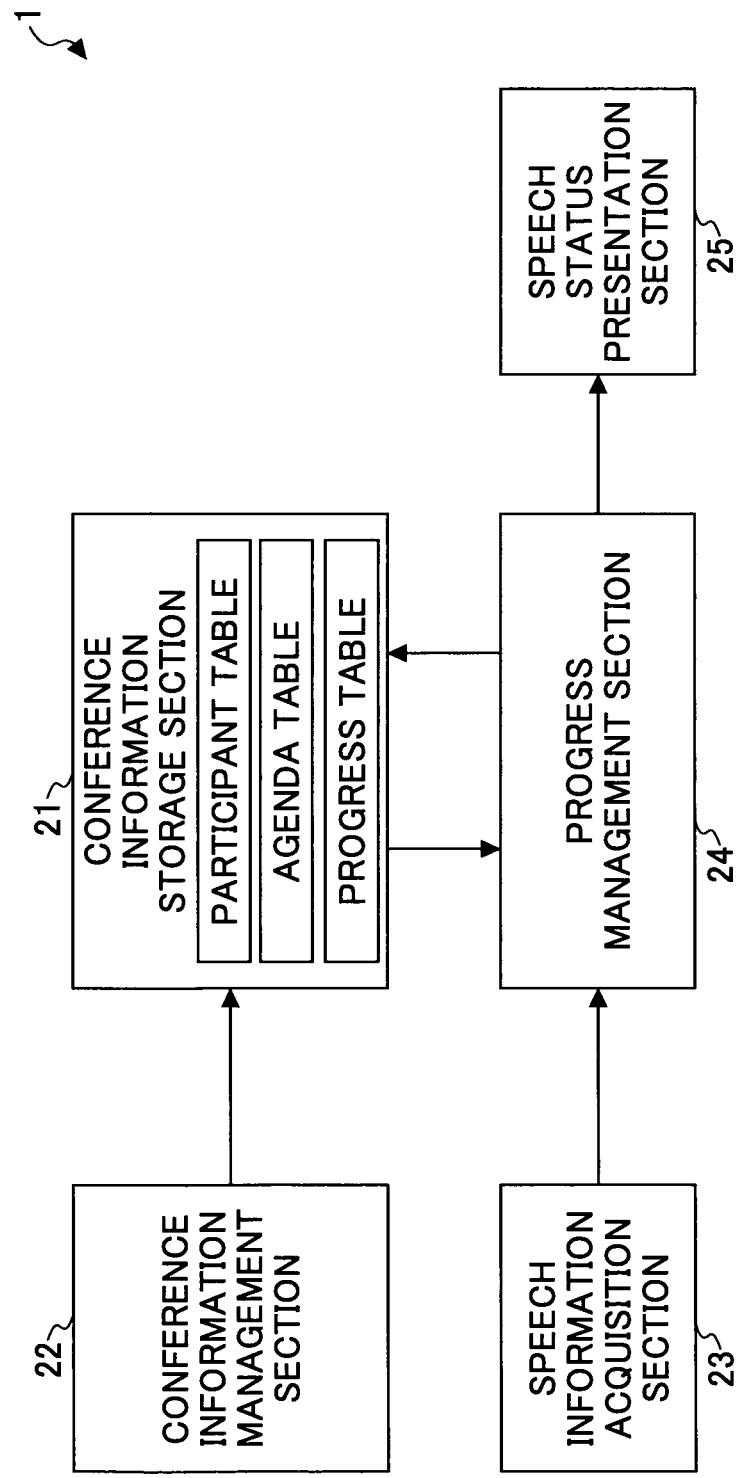
FIG. 2 is a functional block diagram of the conference progress supporting apparatus according to an embodiment of the present invention.

As illustrated in FIG. 2, the conference progress supporting apparatus 1 includes a conference information storage section 21 storing information of conferences, a conference information management section 22 managing information stored in the conference information storage section 21, a speech information acquisition section 23 acquiring information indicating start and end of speech of each participant, a progress management section 24 managing information of progress of the speech, and a speech status presentation section 25 presenting the information of speech status of each participant of each agenda.

Herein, the conference information storage section 21 is composed of the hard disk device 14. The conference information management section 22 and the progress management section 24 are composed of the CPU 11. The speech information acquisition section 23 is composed of the CPU 11 and the input device 15. The speech status presentation section 25 is composed of the CPU 11 and the display device 16.

Figure 4:
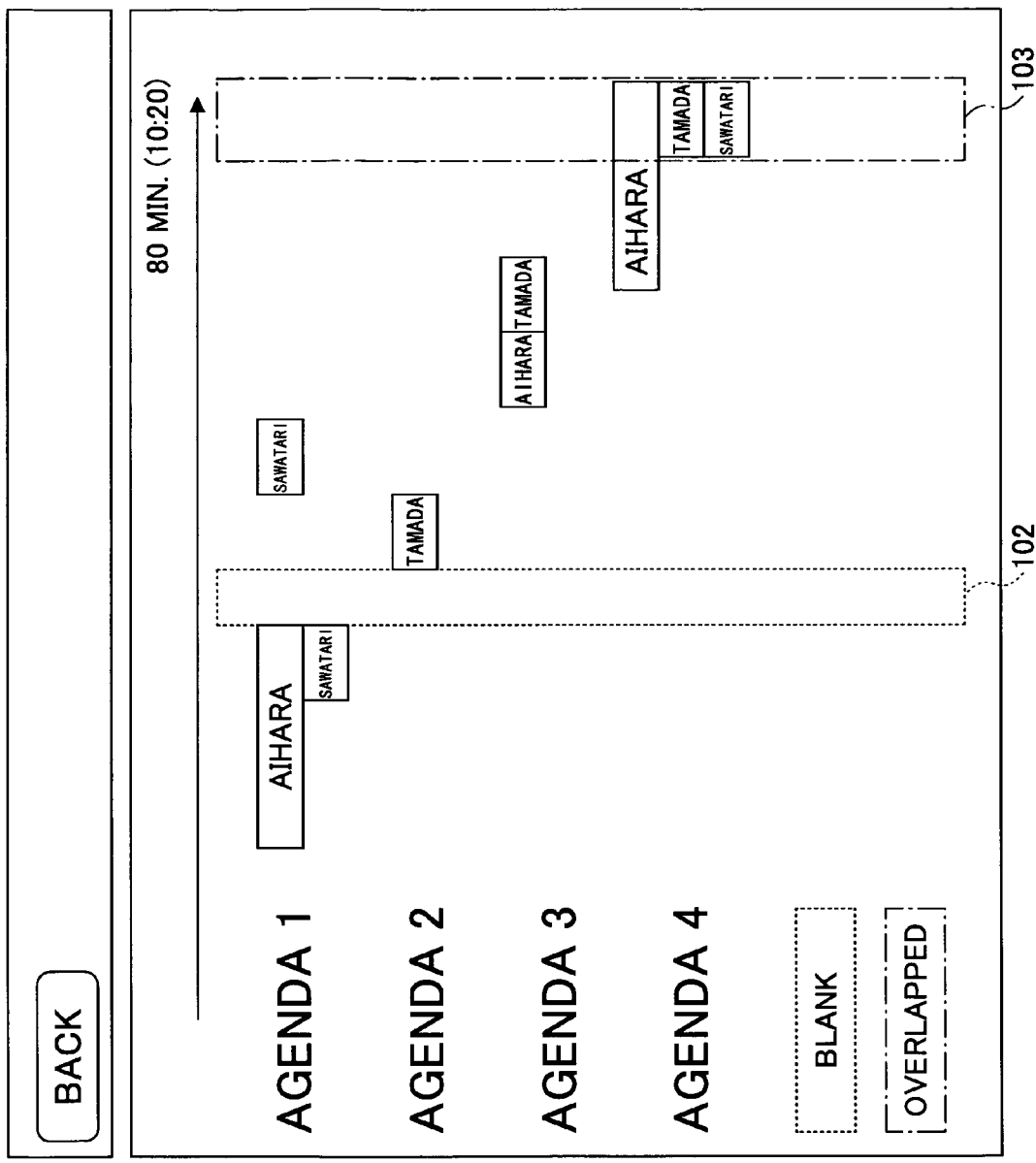
FIG. 4 is a drawing indicating another example when the speech status is presented in the conference progress supporting apparatus according to an embodiment of the present invention.

The speech status presentation section 25 presents (displays) the speech status of each participant of each agenda on the display device 16. Examples of the screens presented by the speech status presentation section 25 are illustrated in FIGS. 3 and 4.

FIG. 3 illustrates a basic interface screen presented by the speech status presentation section 25. The basic interface screen expresses the speech status of each participant in a matrix manner. In the basic interface screen, the agendas are displayed in the rows, the participants are displayed in the columns, and the speech status of each participant of each agenda is displayed in the respective cell.

For example, in FIG. 3, there is an icon displaying "10 min (minutes)" in the cell representing the speech status of "Aihara" of "Agenda 1" (at the cross point of "Aihara" and "Agenda 1" in the matrix of FIG. 3). This icon in the cell represents the speech status in which the participant "Aihara" is speaking (in speech) about "Agenda 1", and further represents that ten (10) minutes has passed since the beginning (start) of the speech. In the following, the icon displayed in each cell is called an "in-speech icon".

Further, in the cells where column titles are displayed, the names of the participants and the sum of how long the participant spoke (hereinafter referred to as "speech time") are provided.

Further, in the cells where row titles are displayed, the names of agendas and the scheduled discussion time and the total time of speech occupied in the scheduled discussion time are displayed in a bar graph format. Further, this bar graph is displayed in a accumulated bar graph manner so that each sum of the speech time of the participants is displayed in the bar graph.

However, the speech status presentation section 25 may present (display) the agenda under discussion, the speech status representing the participant in speech and the elapsed time of the speech in any manner other than the above-described matrix manner.

Further, the speech status presentation section 25 may present (display) the sum of the speech time for each agenda and each sum of the speech time of the participants in any manner other than the above-described accumulated bar graph manner.

Further, in addition to the above-described matrix displaying the speech status of each participant, the basic interface screen further displays the scheduled discussion time of the entire conference and the elapsed time since the beginning (start) of the conference. For example, the character string "15 min/70 min" displayed in FIG. 3 represents that the scheduled discussion time of the entire conference is 70 minutes and the elapsed time since the beginning (start) of the conference is 15 minutes.

Further, the basic interface screen further displays various menu buttons. In the example of FIG. 3, as the various menu buttons, a "CLOSE", a "PARTICIPANT MANAGE", an "AGENDA MANAGE", and a "REVIEW" buttons are displayed.

FIG. 4 illustrates an example of a review screen presented by the speech status presentation section 25. The review screen is presented when the "REVIEW" button on the basic interface screen in FIG. 3 is pressed. In the review screen, the speech status of each participant is displayed along the time axis. Further, in the review screen, the elapsed time from the beginning (start) of the conference is displayed along the lateral axis, and agendas are displayed along the vertical axis, so that the Gantt chart is formed. In the Gantt chart, the icons representing the time period spoken by the participants are arranged.

In the review screen, a time period when no icon is disposed is recognizably displayed as a time period when no speech is present, that is a time period when the speech is discontinued. In the example of FIG. 4, a rectangular area 102 enclosed by a dashed line represents the time period when no speech is present (blank period).

Further, in the review screen, a time period when plural icons are overlapped is recognizably displayed as a time period when plural speeches are overlapped, that is a time period when simultaneous speeches are present. In the example of FIG. 4, a rectangular area 103 enclosed by a dashed-dotted line represents the time period when simultaneous speeches are present (overlapped period).

In the conference information storage section 21, a participant table, an agenda table, and a progress table are stored. The participant table stores information representing the participants of the conference. The agenda table stores information representing agendas. The progress table stores information representing the progress of the speech of each participant of each agenda.

The participant table is described with reference to FIG. 5.

The participant table is composed of participant information including information items indicating a participant ID identifying the participant, a participant name, a name of a facility to which the participant belongs (facility name), a name of a division to which the participant belongs (division name), and the e-mail address of the participant. The participant information is stored in advance in the participant table by the conference information management section 22 described below.

The agenda table is described with reference to FIG. 6.

The agenda table is composed of agenda information including information items indicating an agenda ID identifying the agenda, a title of the agenda, a scheduled discussion time allocated in advance to the agenda, a contributor ID representing a participant ID of the contributor of the agenda, a name of the participant (participant name) who contributed, and edit time and date. The agenda information is stored in advance in the agenda table by the conference information management section 22 described below.

The progress table is described with reference to FIG. 7.

The progress table is composed of progress information including information items indicating the agenda ID as the target of each speech, the participant ID of the speech, a start time of the speech, an end time of the speech, and the elapsed time since the start time of the speech. When a speech is started in the conference, the progress table is registered in the progress table by the progress management section 24 described below.

The conference information management section 22 displays management screens of the participants and the agendas on the display device 16. Further, based on the information input for the displayed screens, the conference information management section 22 registers, updates, and deletes the participant table and the agenda table.

FIG. 8 illustrates an example of a participant management screen displayed on the display device 16 by the conference information management section 22. The participant management screen is displayed in a form of a dialog box in response to the pressing operation of the "PARTICIPANT MANAGE" button on the basic interface screen in FIG. 3.

The participant management screen is composed of a spread sheet representing the participant table. The information indicating the addition, correction, and deletion of the participant information is input to the spread sheet via the input device 15.

When the "REGISTRATION" button on the participant management screen is pressed, the conference information management section 22 allocates a new participant ID to the added participant information by using the information having been input in the spread sheet, and registers the added information in the participant table, or updates the participant table when the current participant information is to be changed or deleted.

The conference information management section 22 may display user information stored in an external database on the participant management screen, and may register the user information selected via the input device 15 in the participant table as the participant information.

FIG. 9 illustrates an example of an agenda management screen presented on the display device 16 by the conference information management section 22. The agenda management screen is displayed in a form of a dialog box in response to the pressing operation of the "AGENDA MANAGE" button on the basic interface screen in FIG. 3.

The agenda management screen is composed of a spread sheet representing the agenda table. The information indicating the addition, correction, and deletion of the agenda information is input to the spread sheet via the input device 15.

When the "REGISTRATION" button on the agenda management screen is pressed, the conference information management section 22 allocates a new agenda ID to the added agenda information by using the information having been input to the spread sheet, or updates the agenda table when the current agenda information is to be changed or deleted.

Further, as illustrated in FIG. 10, the conference information management section 22 may cause the right end of the bar graph of the scheduled discussion time displayed in the basic interface screen to function as a slider so that the mouse operation on the slider is detected to update the scheduled discussion time of each agenda in response to the mouse operation.

The speech information acquisition section 23 acquires information indicating the start and the end of the speech of each participant of each agenda via the input device 15, and outputs the acquired information to the progress management section 24.

Specifically, when detecting the operation of the input device 15 on the cell of the matrix of the basic interface screen, the speech information acquisition section 23 specifies the agenda ID and the participant ID of the operated cell, and determines whether the acquired information indicates the start of the speech or the end of the speech.

In detail, the speech information acquisition section 23 searches the progress table and, when determining that all the progress information including the specified participant ID and the agenda ID has registered end time, determines that the acquired information indicates the start of the speech. In this case, the speech information acquisition section 23 outputs the start time of the detected operation, the agenda ID, and the participant ID to the progress management section 24 as the information indicating the start of the speech.

Further, the speech information acquisition section 23 searches the progress table and, when determining that there is the progress information having unregistered end time of the speech among the progress information including the participant ID and the agenda ID having been input by the speech information acquisition section 23, determines that the acquired information indicates the end of the speech. In this case, the speech information acquisition section 23 outputs the end time of the detected operation, the agenda ID, and the participant ID to the progress management section 24 as the information indicating the end of the speech.

As an example of the operations of the input device 15 detected by the speech information acquisition section 23, there are click and double-click operations of the mouse on the cell of the matrix and a drag operation of the mouse to move the in-speech icon outside the matrix.

For example, when a click operation on the cell representing "Agenda 1" and the participant "Aihara" is detected, the speech information acquisition section 23 specified the agenda ID of "Agenda 1" and the participant ID of "Aihara" of the operated cell, and outputs the information indicating the start or the end of the speech to the progress management section 24.

Further, when the operation of dragging the in-speech icon displayed on the cell representing the "Agenda 1" and the participant "Aihara" to outside the matrix by the mouse is detected, the speech information acquisition section 23 specified the agenda ID of "Agenda 1" and the participant ID of "Aihara" of the operated cell, and outputs the information indicating the start or the end of the speech to the progress management section 24.

When inputting (receiving) the information indicating the start or the end of the speech from the speech information acquisition section 23, the progress management section 24 updates the progress table.

Specifically, when inputting the information indicating the start of the speech from the speech information acquisition section 23, the progress management section 24 generates a new progress information based the input information, and registers the new progress information in the progress table.

In this case, when the participant has ever spoken of the agenda, the progress management section 24 calculates the accumulated speech time based on the progress table and registers the accumulated speech time as the elapsed time in the new generating progress information.

Further, when inputting the information indicating the end of the speech from the speech information acquisition section 23, the progress management section 24 registers the end time of the speech in the relevant progress information.

Further, the progress management section 24 measures the elapsed time since the progress information is registered in the progress table until the end time is registered in the registered progress information to update the registered progress information.

Specifically, the progress management section 24 measures the time elapsed since the start time and adds the measured time to the elapsed time included in the registered progress information to obtain calculated new elapsed time, and update the progress information by updating the elapsed time based on the calculated new elapsed time.

Further, when the information indicating the start of the speech of another agenda is input from the speech information acquisition section 23 during the measurement of the elapsed time, the progress management section 24 assumes that the speech relevant to the measuring elapsed time ends. Namely, the progress management section 24 registers the start time of the speech of the another agenda as the end time of the progress information relevant to the measuring elapsed time. At the same time, the progress management section 24 generates a new progress information by registering the start time of the new speech to the agenda of the new speech, and registering the progress information in the progress table.

Further, when the information indicating the start of the speech of another participant of the same agenda is input from the speech information acquisition section 23 during the measurement of the elapsed time, the progress management section 24 assumes that simultaneous speech of the same agenda is started by plural participants. Namely the progress management section 24 generates the progress information indicating the another participant's speech of the same agenda, and registers the progress information in the progression table. In this case, the progress management section 24 measures each elapsed time of the plural speeches of the participants of the same agenda from the respective start time, and updates each progress information.

Further, when the information indicating the start of the speech of another participant of a different agenda is input during the measurement of the elapsed time, the progress management section 24 may assume that the simultaneous speech of plural agendas starts without assuming that speech under the measurement ends.

In this case, the conference information storage section 21 may store a flag indicating whether the simultaneous speech of plural agendas is allowed, and the conference information management section 22 may change the value of the flag based on the input operation by the facilitator.

Further, when the progress information of the progress table is updated, the speech status presentation section 25 updates the basic interface screen.

Specifically, regarding the progress information having unregistered end time among the progress information registered in the progress table, the speech status presentation section 25 displays the in-speech icon in the relevant cell on the basic interface screen. In the in-speech icon, the accumulated elapsed time of the speech of the participant of the agenda is displayed.

Further, the speech status presentation section 25 counts up the elapsed time of the progress information registered in the progress table to update the accumulated speech time of each participant and accumulated speech time of each agenda and each components (breakdown) of speech time of each participant in the accumulated speech time of each agenda.

In the following, examples of the basic interface screens updated by the speech status presentation section 25 are described with reference to FIGS. 11 to 15.

Figure 11:
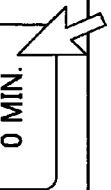
FIG. 11 is a drawing indicating an example of a screen at a speech start time in the conference progress supporting apparatus according to an embodiment of the present invention.

FIG. 11 illustrates an example of the basic interface screen when speech starts.

In a case where the participant "Aihara" starts speech of "Agenda 1", when the relevant cell is clicked, the information indicating the start of the speech is acquired by the speech information acquisition section 23, and the progress table is updated by the progress management section 24.

In this case, based on the updated progress table, the speech status presentation section 25 displays the in-speech icon displaying the elapsed time "0 min" in the cell representing "Agenda 1" and "Aihara".

FIG. 12 illustrates an example of the basic interface screen when speech ends.

In a case where the participant "Sawatari" ends speech of "Agenda 1", when the in-speech icon on the relevant cell is dragged and moved outside the matrix, the information indicating the end of the speech is acquired by the speech information acquisition section 23, and the progress table is updated by the progress management section 24.

In this case, based on the updated progress table, the speech status presentation section 25 deletes the in-speech icon on the cell representing "Agenda 1" and "Sawatari".

Further, when an in-speech icon is clicked or double-clicked, the speech status presentation section 25 also deletes the relevant in-speech icon based on the progress table.

Figure 13:
FIG. 13 is a drawing indicating an example of a screen when a speaker is changed in the conference progress supporting apparatus according to an embodiment of the present invention.

FIG. 13 illustrates an example of the basic interface screen when a speaker is changed.

In a case where the participant "Aihara" ends speech of "Agenda 1" and a participant "Tamada" starts speech of "Agenda 2", while the in-speech icon is displayed in the cell representing "Agenda 1" and "Aihara" and when the cell representing "Agenda 2" and "Tamada" is clicked, the information indicating the start of the speech is acquired by the speech information acquisition section 23, and the progress table is updated by the progress management section 24.

In this case, the speech status presentation section 25 deletes the in-speech icon on the cell representing "Agenda 1" and "Aihara" and displays the in-speech icon displaying the elapsed time "0 min" in the cell representing "Agenda 2" and "Tamada".

Figure 14:
FIG. 14 is a drawing indicating an example of a screen when a speech is resumed in the conference progress supporting apparatus according to an embodiment of the present invention.

FIG. 14 illustrates an example of the basic interface screen when a speaker resumes the speech.

In a case where the participant "Sawatari" ends six-minute speech of "Agenda 1", and after another participant's speech of another agenda, "Sawatari" starts the speech of "Agenda 1" again, when the cell representing "Agenda 1" and "Sawatari" is clicked, the information indicating the start of the speech is acquired by the speech information acquisition section 23, and the progress table is updated by the progress management section 24.

In this case, based on the updated progress table, the speech status presentation section 25 displays the in-speech icon displaying the already-spoken elapsed time "6 min" in the cell representing "Agenda 1" and "Sawatari".

Figure 15:
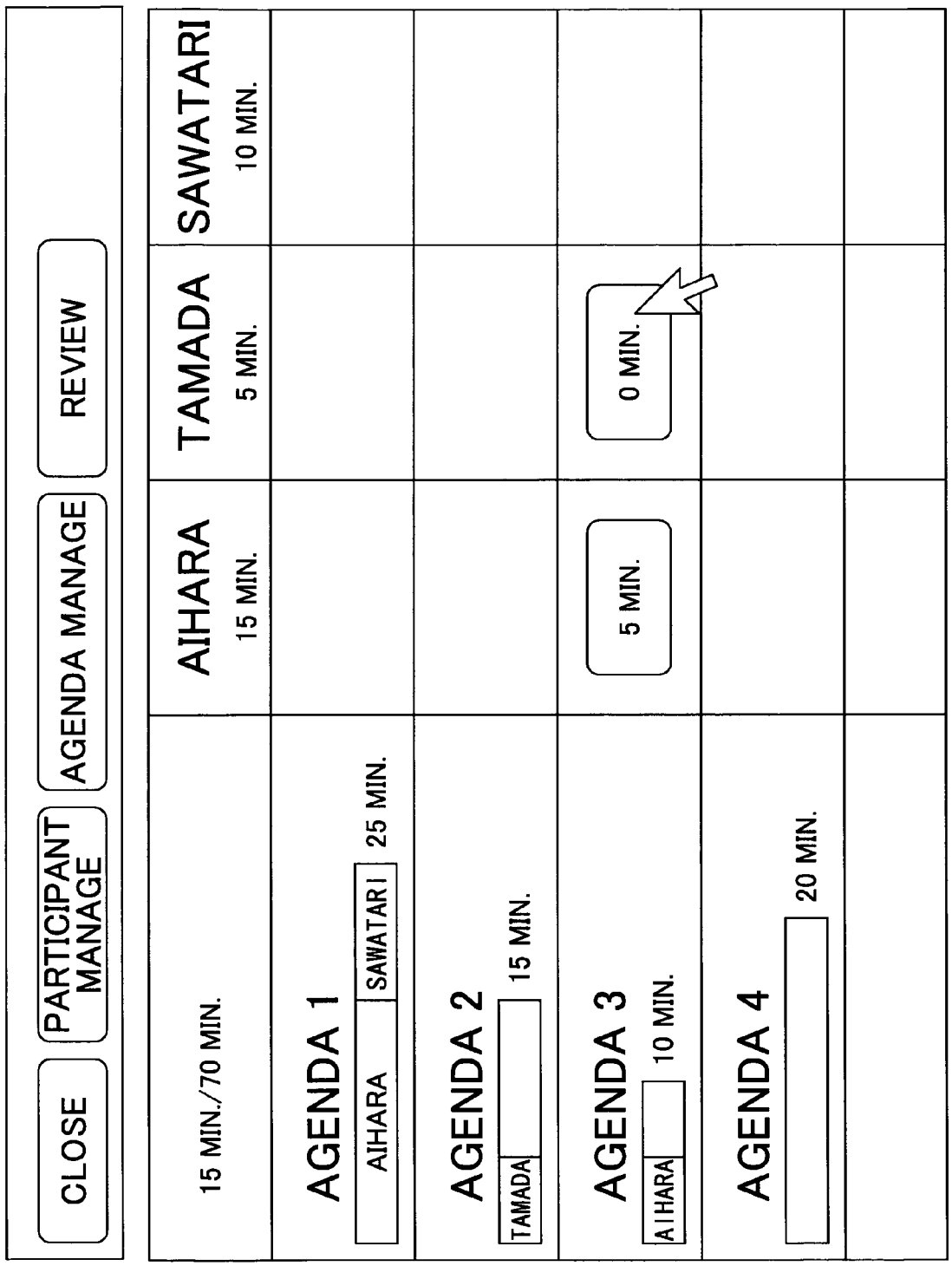
FIG. 15 is a drawing indicating an example of a screen when simultaneous speech starts in the conference progress supporting apparatus according to an embodiment of the present invention.

FIG. 15 illustrates an example of the basic interface screen when the simultaneous speech is started by the participants.

In a case where, while the participant "Aihara" speaks of "Agenda 3", the participant "Tamada" also starts the speech of "Agenda 3", when, while the in-speech icon is displayed in the cell representing "Agenda 3" and "Aihara", the cell representing "Agenda 3" and "Tamda" is clicked, the information indicating the start of the speech is acquired by the speech information acquisition section 23, and the progress table is updated by the progress management section 24.

In this case, based on the updated progress table, while displaying the in-speech icon in the cell representing "Agenda 3" and "Aihara", the speech status presentation section 25 further displays the in-speech icon in the cell representing "Agenda 3" and "Tamada".

Next, the operations of the above-configured conference progress supporting apparatus 1 are described with reference to FIGS. 16 through 20.

Figure 16:
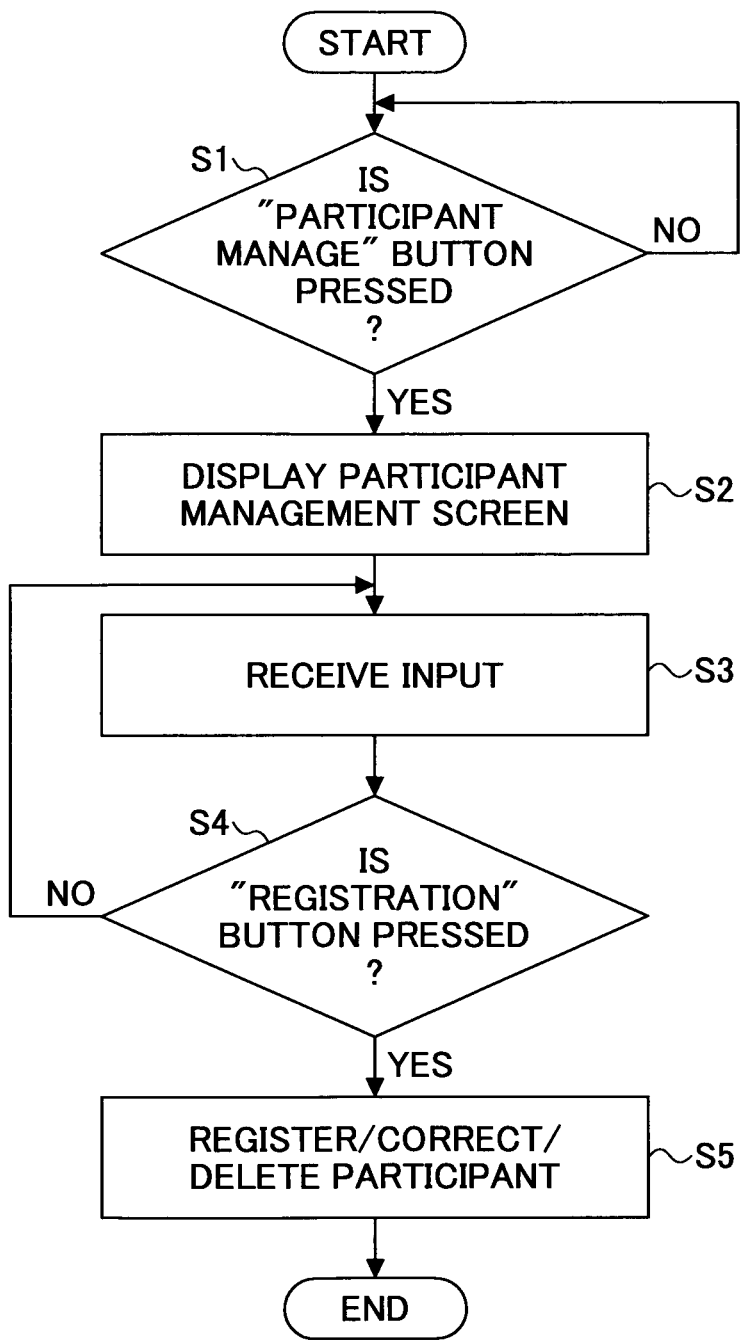
FIG. 16 is a flowchart illustrating a process of managing the participants by the conference progress supporting apparatus according to an embodiment of the present invention.

First, the operations of managing the participant information in the conference progress supporting apparatus 1 are described with reference to FIG. 16. Herein, it is assumed that the following operations are started when the basic interface screen (as illustrated in FIG. 3) is displayed on the display device 16.

First, when the "PARTICIPANT MANAGE" button on the basic interface screen is pressed (YES in step S1), the participant management screen (as illustrated in FIG. 8) is displayed by the conference information management section 22 (step S2).

Next, the information indicating the addition, correction, or deletion of the participant information is input from the input device 15, and the participant management screen is updated by the conference information management section 22 (step S3).

Next, when the "REGISTRATION" button on the participant management screen is pressed (YES in step S4), the conference information management section 22 registers the participant information in the participant table based on the information input in step S3 to correct or delete the existing participant information (step S5).

After the above operations, the conference progress supporting apparatus 1 ends the operations of managing the participant information.

Figure 17:
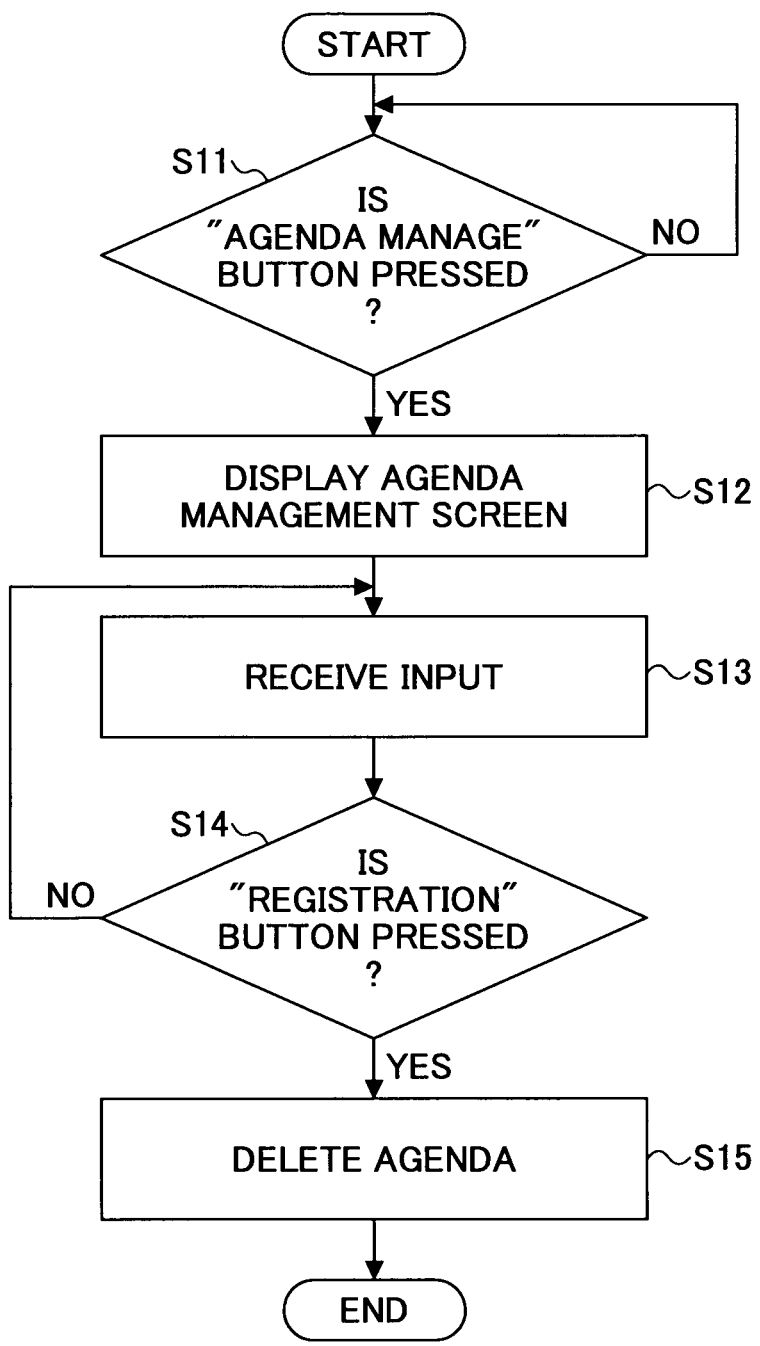
FIG. 17 is a flowchart illustrating process of managing the agendas by the conference progress supporting apparatus according to an embodiment of the present invention.

Next, the operations of managing the agenda information in the conference progress supporting apparatus 1 are described with reference to FIG. 17. Herein, it is assumed that the following operations are started when the basic interface screen is displayed on the display device 16.

First, when the "AGENDA MANAGE" button on the basic interface screen is pressed (YES in step S11), the agenda management screen (as illustrated in FIG. 9) is displayed by the conference information management section 22 (step S12).

Next, the information indicating the addition, correction, or deletion of the agenda information is input from the input device 15, and the agenda management screen is updated by the conference information management section 22 (step S13).

Next, when the "REGISTRATION" button on the agenda management screen is pressed (YES in step S14), the conference information management section 22 registers the agenda information in the agenda table based on the information input in step S13 to correct or delete the existing agenda information (step S15).

After the above operations, the conference progress supporting apparatus 1 ends the operations of managing the agenda information.

Figure 18:
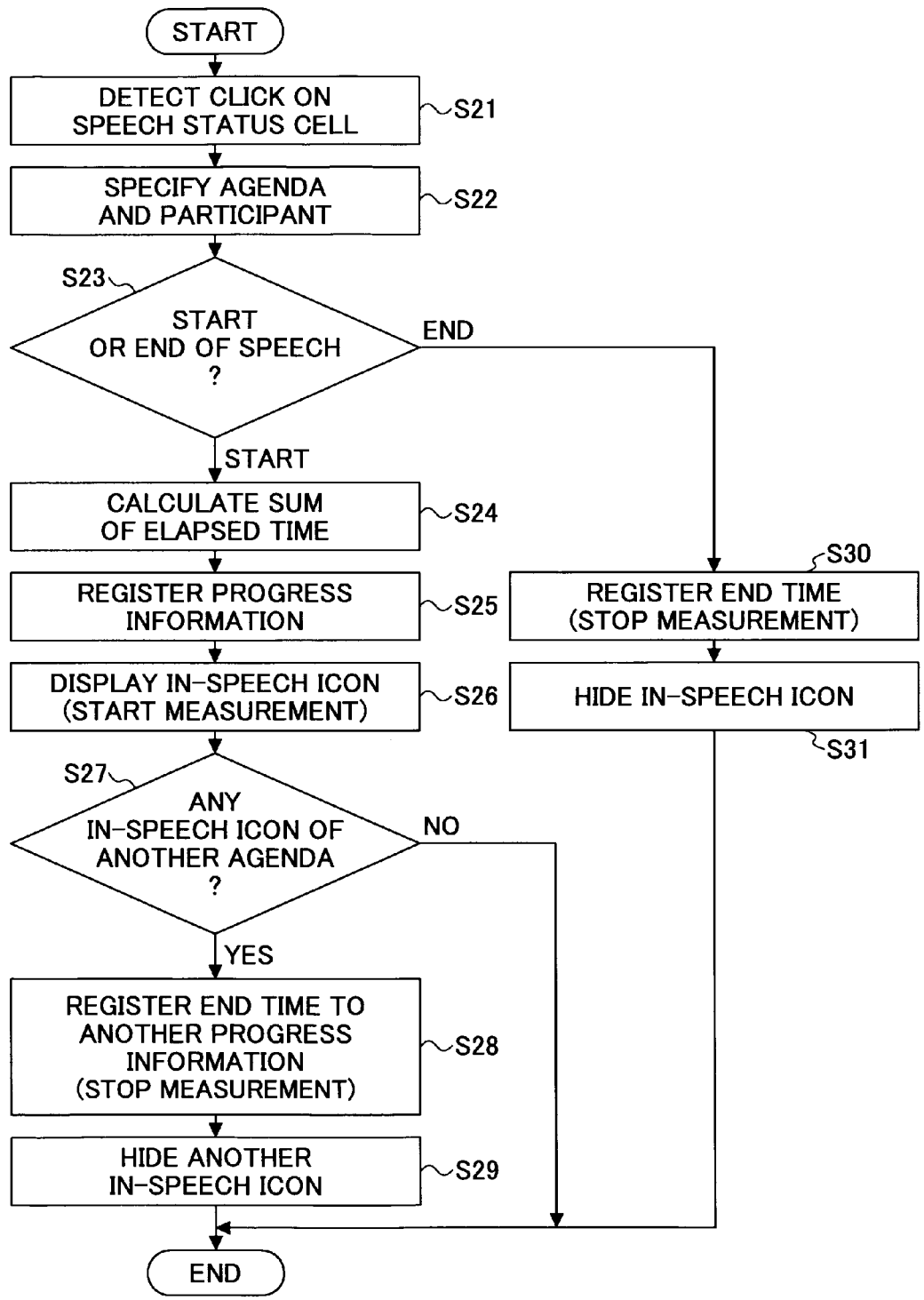
FIG. 18 is a flowchart illustrating process of presenting the speech status by the conference progress supporting apparatus according to an embodiment of the present invention.

Next, the operations of managing the speech status in the conference progress supporting apparatus 1 are described with reference to FIG. 18. Herein, it is assumed that, by performing the operations as indicated in FIGS. 16 and 17, the participant information and the agenda information are already stored in the conference information storage section 21. Further, it is assumed that the following operations are started when the basic interface screen is displayed on the display device 16.

First, an operation performed on the cell of the matrix of the basic interface screen is detected by the speech information acquisition section 23 (step S21).

Next, the agenda ID and the participant ID represented by the operated cell are specified by the speech information acquisition section 23 (step S22).

Next, it is determined whether the speech of the participant of the agenda is started or ended by the speech information acquisition section 23 (step S23).

When determining that the speech is started in step S23, the progress information indicating the agenda and the speech of the participant is searched for in the progress table and the sum of the elapsed time registered in the relevant progress information is calculated by the progress management section 24 (step S24). In this case, when the relevant progress information is not searched for, the sum of the elapsed time is calculated as zero (0) minutes.

Next, the progress information including the information items indicating the start time of the operation detected in step S21, the sum of the elapsed time calculated in step S24, the agenda ID, and the participant ID is registered in the progress table by the progress management section 24 (step S25).

Next, the speech status presentation section 25 displays the in-speech icon indicating the sum of the elapsed time calculated in step S24 in the cell representing the agenda and the participant (step S26).

Next, the progress management section 24 determines whether another in-speech icon is being displayed that represents an agenda other than the agenda specified in step S22 (step S27). Specifically, the progress management section 24 determines whether there is the progress information that indicates the speech of another agenda and that includes unregistered end time.

Herein, when determining that the in-speech icon representing another agenda is being displayed, the time detected by the operation in step S21 is registered as the end time to the progress information corresponding to the in-speech icon representing the another agenda (step S28).

Next, the speech status presentation section 25 hides the in-speech icon representing the another agenda (step S29). Then, the conference progress supporting apparatus 1 ends the operations of managing the speech status.

On the other hand, in the case where there is no displaying in-speech icon representing another agenda in step S27, the conference progress supporting apparatus 1 ends the operations of managing the speech status.

Further, when determining that the speech ends in step S23, the time detected by the operation in step S21 is registered as the end time to the progress information representing the participant and the agenda by the progress management section 24 (step S30). Then, the speech status presentation section 25 hides the relevant in-speech icon (step S31), and the conference progress supporting apparatus 1 ends the operations of managing the speech status.

Figure 19:
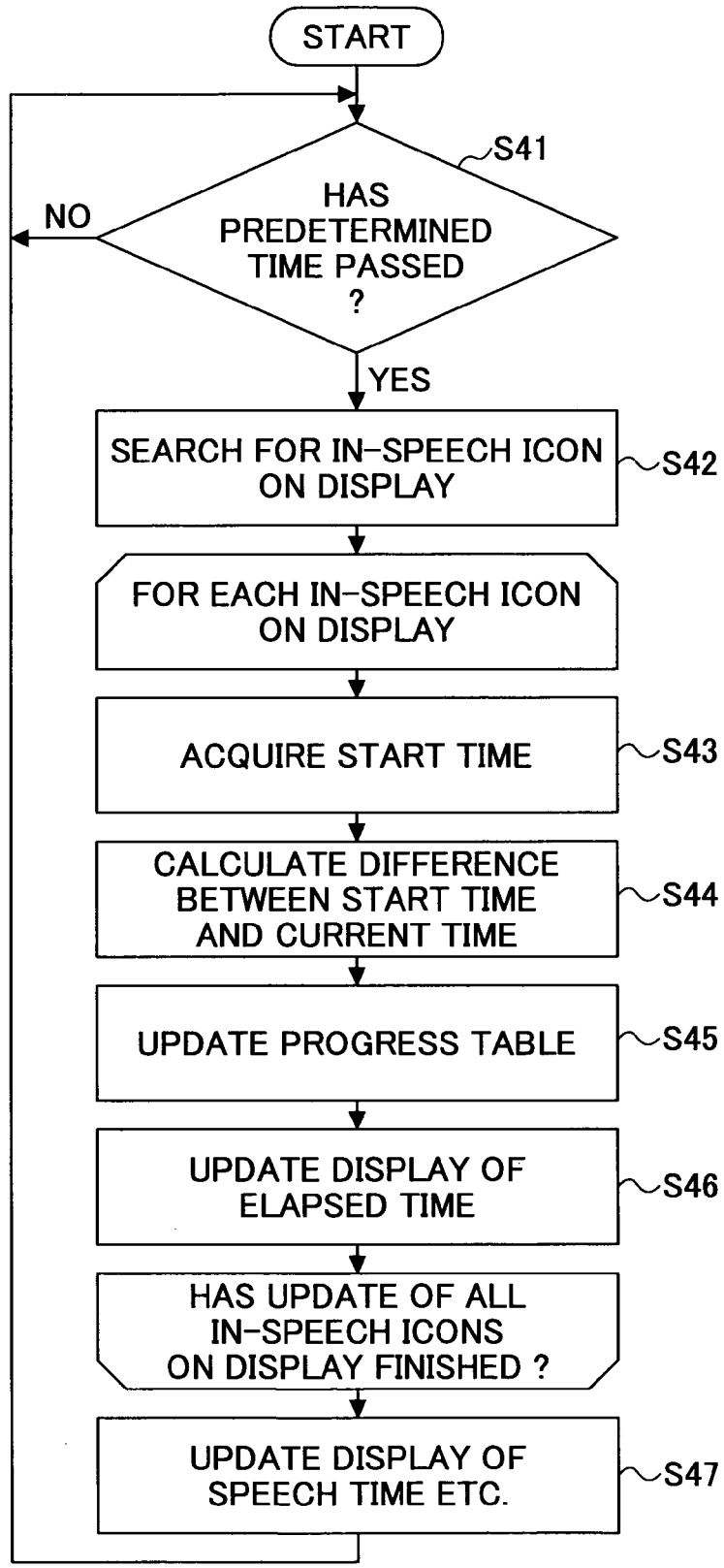
FIG. 19 is a flowchart illustrating process of measuring an elapsed time by the conference progress supporting apparatus according to an embodiment of the present invention.

Next, the operations of measuring the elapsed time of the speech in the conference progress supporting apparatus 1 are described with reference to FIG. 19.

First, the progress management section 24 determines whether a predetermined time period has passed since the previous measurement operation (step S41). When determining that the predetermined time period has not passed yet, the process in step S41 is performed again.

On the other hand, when determining that the predetermined time period has passed, the in-speech icons displayed on the basic interface screen are searched for by the progress management section 24 (step S42). Specifically, the progress management section 24 searches for the progress information that is registered in the progress table and that includes unregistered end time.

Next, the processes in steps S43 through S46 are performed on the progress information corresponding to the searched-for in-speech icons.

First, each start time of the progress information relevant to the in-speech icons is acquired by the progress management section 24 (step S43).

Next, the time difference between the acquired start time and the current time is calculated by the progress management section 24 (step S44).

Next, the time difference calculated in step S44 is added to the relevant elapsed time of the progress information, and the progress table is updated by the progress management section 24 (step S45)

Next, each display of the elapsed time on the in-speech icons is updated by the speech status presentation section 25 (step S46).

When the update of the elapsed time for all the displaying in-speech icons is completed, the various displays on the basic interface screen are updated by the speech status presentation section 25 (step S47). Specifically, the display of the accumulated speech time of each participant is updated. Further, the sum of the speech time of each agenda and the components (breakdown) of each participant are updated. Further, the display of the sum of the speech time in the scheduled discussion time of the entire conference is updated.

The conference progress supporting apparatus 1 continuously performs the process from step S41 until the information indicating the end of the conference is input.

Figure 20:
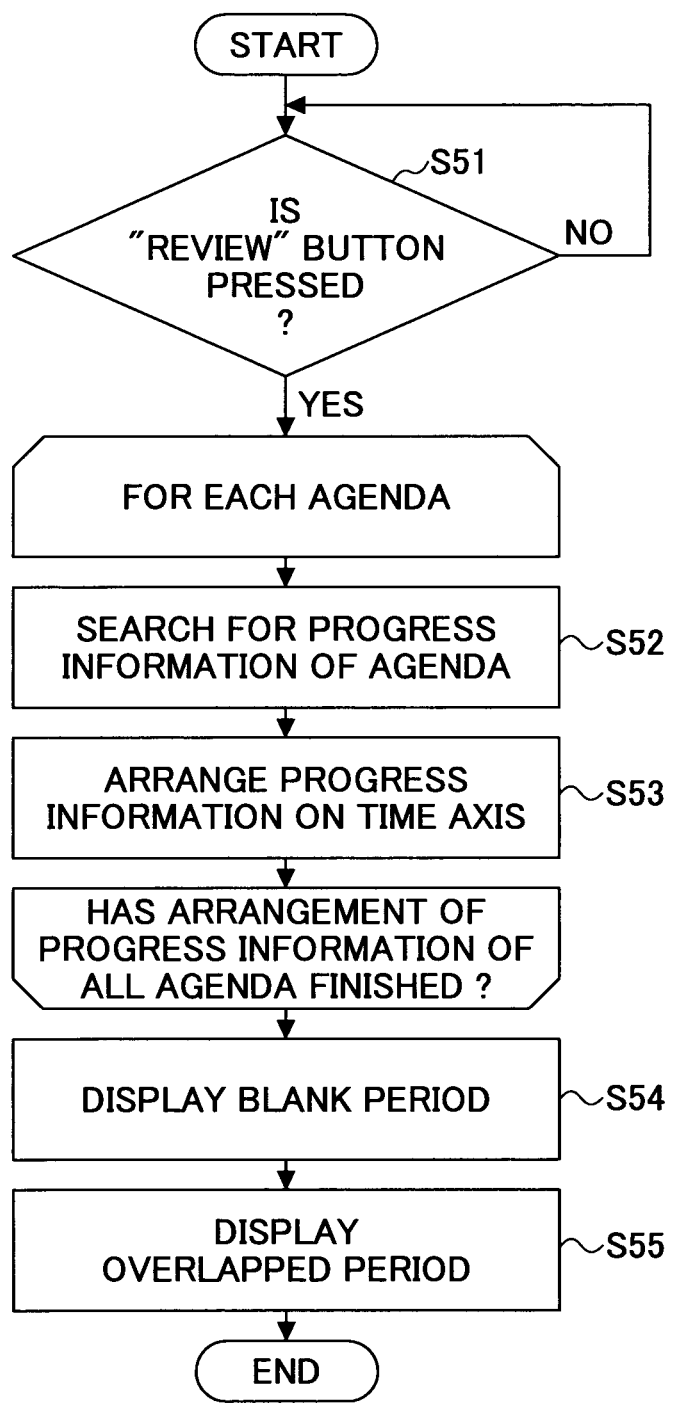
FIG. 20 is a flowchart illustrating process of presenting the speech status from the conference start time by the conference progress supporting apparatus according to an embodiment of the present invention.

Next, the operations of displaying the speech status from the start of the conference as the review screen in the conference progress supporting apparatus 1 are described with reference to FIG. 20. Herein, it is assumed that the following operations are started when the basic interface screen is displayed on the display device 16.

First, when the "REVIEW" button on the basic interface screen is pressed (YES in step S51), the processes of steps S52 and S53 are performed on each agenda registered in the agenda table.

First, the progress information including the agenda ID of the relevant agenda is searched for from the progress table by the speech status presentation section 25 (step S52).

Next, based on each progress information searched for in step S52, the icons representing their time period between the start time and the end time are arranged on the time axis of the relevant agenda by the speech status presentation section 25 (step S53).

When the display of the icons corresponding to the progress information for all the agendas are completed, the blank period in which no icon is arranged on the time axis of any agenda is presented by the speech status presentation section 25 (step S54).

Next, the overlapped period in which the icons are overlappedly arranged is presented by the speech status presentation section 25 (step S55).

After the above operations, the conference progress supporting apparatus 1 ends the operations of presenting the speech status from the start of the conference as the review screen.

As described above, the conference progress supporting apparatus 1 according to an embodiment of the present invention may store the progress information of the speech in response to the acquisition of the information indicating the start and end of the speech of each participant, and, based on the progress information, present the information representing the speech status of each participant, thereby allowing the facilitator to recognize the speech status and supporting the management of the speech status.

In the above description, a case is described where the conference progress supporting apparatus 1 is provided so as to manage the speech status to manage one conference. However, the conference progress supporting apparatus 1 may be provided so as to manage the speech status of each conference among plural conferences.

To that end, the conference information storage section 21 stores the information of each conference in advance, and the conference information management section 22 registers the participants and the agendas for each conference. Further, the progress management section 24 registers the progress information of the speech in the progress table for each conference. Further, the speech status presentation section 25 presents the speech status for each conference.

Further, in the above embodiment of the present invention, a case is described where the conference progress supporting apparatus 1 manages the speech status for each participant. However, the conference progress supporting apparatus 1 may also be applied to a remote conference system connecting to a remote facility and supporting a conference and manage the speech status for each facility of the participants.

Figure 21:
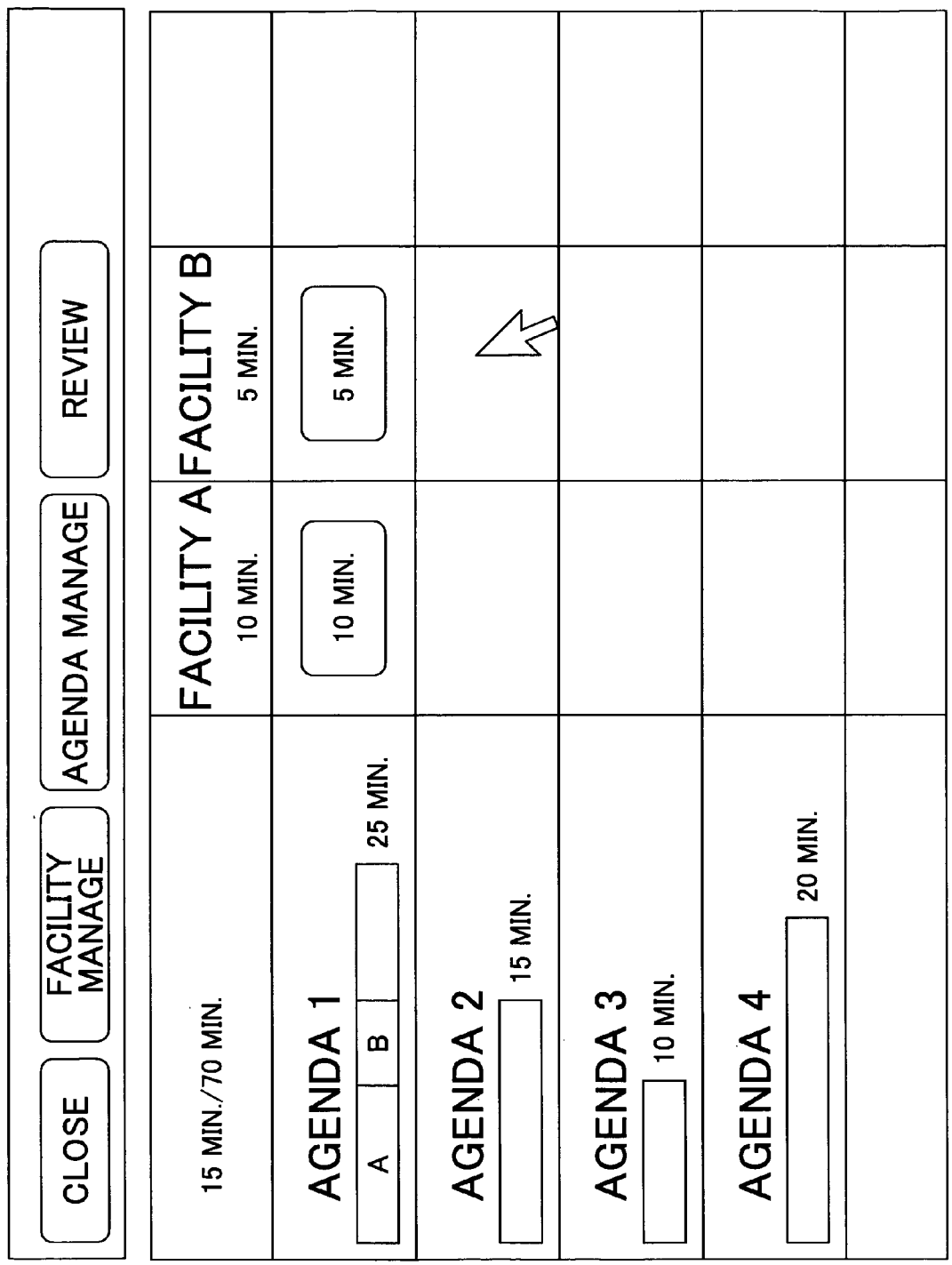
FIG. 21 is a drawing indicating an example of a screen presenting each speech status of facilities by the conference progress supporting apparatus according to an embodiment of the present invention.

In this case, in the basic interface screen, the facilities are arranged in the columns and the speech status of each facility of agenda is expressed in the cell by the speech status presentation section 25 as illustrated in FIG. 21. Further, the progress management section 24 registers and manages the progress information representing the speech of each facility of each agenda in the progress table.

The present application is based on and claims the benefit of priority of Japanese Patent Application No. 2009-232979 filed on Oct. 7, 2009, the entire contents of which are hereby incorporated herein by reference.

The invention claimed is:

1. A conference progress supporting apparatus supporting progress of a conference, the conference progress supporting apparatus comprising:
   a conference information storage unit configured to associate and store agenda identification information, which identifies an agenda of the conference, with participant identification information, which identifies a plurality of participants of the conference;
   an elapsed-time information storage unit configured to associate and store the agenda identification information with information items including the participant identification information, speech start time information indicating start time of a speech of each of the plurality of participants, speech end time information indicating end time of the speech of each of the plurality of participants, and speech elapsed time information indicating elapsed time of the speech since the start time of the speech of each of the plurality of participants;

a speech status presentation unit configured to display on a display unit an area, in which each of the plurality of participants is associated with the agenda, and speech time information, which indicates a speech time of each of the plurality of participants, corresponding to the agenda related to the area, based on the agenda identification information and the participant identification information stored in the conference information storage unit;

a speech information acquisition unit configured to, in response to an operation applied to a portion of the area, which corresponds to a participant of the plurality of participants, displayed on the display unit, acquire the agenda identification information and the participant identification information corresponding to the portion of the area on which the operation has been applied; and an elapsed-time management unit configured to, in response to the acquisition of the agenda identification information and the participant identification information corresponding to the portion of the area on which the operation has been applied, calculate accumulated elapsed time by acquiring all elapsed time associated with the acquired agenda identification information and the participant identification information from among the elapsed time of the speech stored in the elapsed-time information storage unit, store start time indicating when the agenda identification information and the participant identification information are acquired and the calculated accumulated elapsed time in the elapsed-time information storage unit, measure the elapsed time of the speech until information indicating an end of the speech is acquired, and update the accumulated elapsed time based on the measured elapsed time of the speech, wherein the speech status presentation unit is configured to display the accumulated elapsed time updated by the elapsed-time management unit in the area as information indicating speech time of the participant of the plurality of participants, which corresponds to the portion of the area on which the operation has been applied, and wherein the speech status presentation unit is configured to arrange the speech time information indicating each speech on a time axis, and to present a time period when no information indicating a speech is arranged and a time period when plural information indicating speeches are overlapped.

2. A conference progress supporting method used in a conference progress supporting apparatus supporting progress of a conference, the conference progress supporting method comprising:

associating and storing, by a conference information storage unit, agenda identification information, which identifies an agenda of the conference, with participant identification information, which identifies a plurality of participants of the conference;

associating and storing, by an elapsed-time information storage unit, the agenda identification information with information items including the participant identification information, speech start time information indicating start time of a speech of each of the plurality of participants, speech end time information indicating end time of the speech of each of the plurality of participants, and speech elapsed time information indicating elapsed time of the speech since the start time of the speech of each of the plurality of participants;

displaying, on a display unit by a speech status presentation unit, an area, in which each of the plurality of participants is associated with the agenda, and speech time information, which indicates a speech time of each of the plurality of participants, corresponding to the agenda related to the area, based on the agenda identification information and the participant identification information stored by the associating and storing in the conference information storage unit;

acquiring, by a speech information acquisition unit, in response to an operation applied to a portion of the area, which corresponds to a participant of the plurality of participants, displayed on the display unit, the agenda identification information and the participant identification information corresponding to the portion of the area on which the operation has been applied;

in response to the acquiring of the agenda identification information and the participant identification information corresponding to the portion of the area on which the operation has been applied, calculating, by an elapsed-time management unit, accumulated elapsed time by acquiring all elapsed time associated with the acquired agenda identification information and the participant identification information from among the elapsed time of the speech stored by the associating and storing in the elapsed-time information storage unit, storing, by the elapsed-time management unit, start time indicating when the agenda identification information and the participant identification information are acquired and the calculated accumulated elapsed time in the elapsed-time information storage unit, measuring, by the elapsed-time management unit, the elapsed time of the speech until information indicating an end of the speech is acquired, and updating, by the elapsed-time management unit, the accumulated elapsed time based on the measured elapsed time of the speech;

displaying, by the speech status presentation unit, the accumulated elapsed time updated by the updating in the area as information indicating speech time of the participant of the plurality of participants, which corresponds to the portion of the area on which the operation has been applied; and displaying, by the speech status presentation unit, the speech time information indicating each speech on a time axis, and presenting a time period when no information indicating a speech is arranged and a time period when plural information indicating speeches are overlapped.

3. A non-transitory computer-readable storage medium including computer executable instructions, wherein the instructions, when executed by a computer, cause the computer to perform a conference progress supporting method, the conference progress supporting method comprising:

associating and storing agenda identification information, which identifies an agenda of the conference, with participant identification information, which identifies a plurality of participants of the conference;

associating and storing the agenda identification information with information items including the participant identification information, speech start time information indicating start time of a speech of each of the plurality of participants, speech end time information indicating end time of the speech of each of the plurality of participants, and speech elapsed time information indicating elapsed time of the speech since the start time of the speech of each of the plurality of participants;

displaying on a display unit an area, in which each of the plurality of participants is associated with the agenda, and speech time information, which indicates a speech time of each of the plurality of participants, corresponding to the agenda related to the area, based on the agenda identification information and the participant identification information stored;

acquiring in response to an operation applied to a portion of the area, which corresponds to a participant of the plurality of participants, displayed on the display unit, the agenda identification information and the participant identification information corresponding to the portion of the area on which the operation has been applied;

in response to the acquiring of the agenda identification information and the participant identification information corresponding to the portion of the area on which the operation has been applied, calculating accumulated elapsed time by acquiring all elapsed time associated with the acquired agenda identification information and the participant identification information from among the elapsed time of the speech stored, storing start time indicating when the agenda identification information and the participant identification information are acquired and the calculated accumulated elapsed time, measuring the elapsed time of the speech until information indicating an end of the speech is acquired, and updating the accumulated elapsed time based on the measured elapsed time of the speech;

displaying the accumulated elapsed time updated by the updating in the area as information indicating speech time of the participant of the plurality of participants, which corresponds to the portion of the area on which the operation has been applied; and displaying the speech time information indicating each speech on a time axis, and presenting a time period when no information indicating a speech is arranged and a time period when plural information indicating speeches are overlapped.

4. The conference progress supporting apparatus according to claim 1, wherein the speech status presentation unit is configured to display another area associated with another agenda, and the elapsed-time management unit is configured to measure the elapsed time of the speech until the information indicating the end of the speech is acquired, the information indicating the end of the speech being associated with an operation applied to the another area associated with the another agenda.

* * * * *